July 20, 1943.   E. OLSON   2,324,592
HEAT CONTROL
Filed Oct. 23, 1941   3 Sheets-Sheet 1
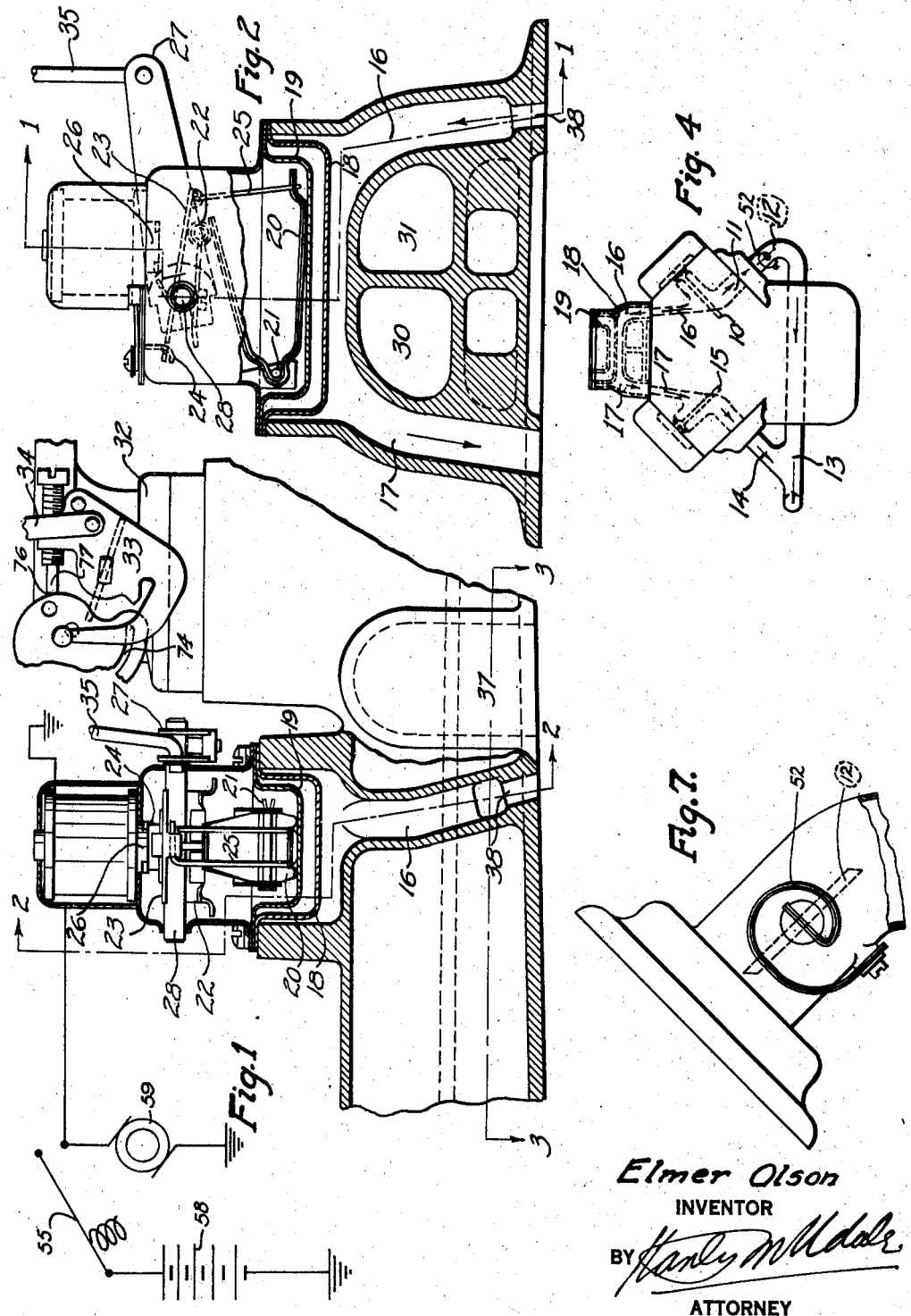
Elmer Olson
INVENTOR
BY
ATTORNEY

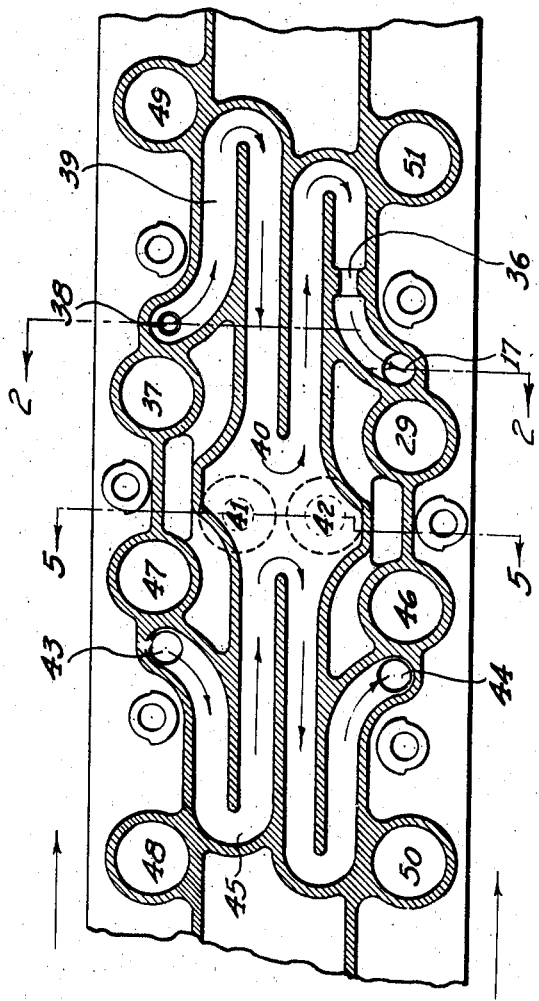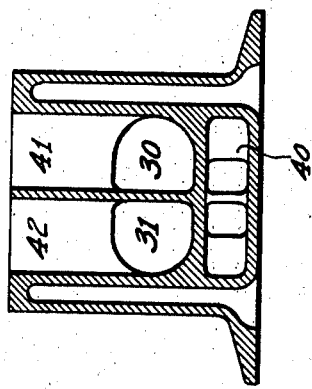

July 20, 1943.  E. OLSON  2,324,592
HEAT CONTROL
Filed Oct. 23, 1941  3 Sheets-Sheet 3
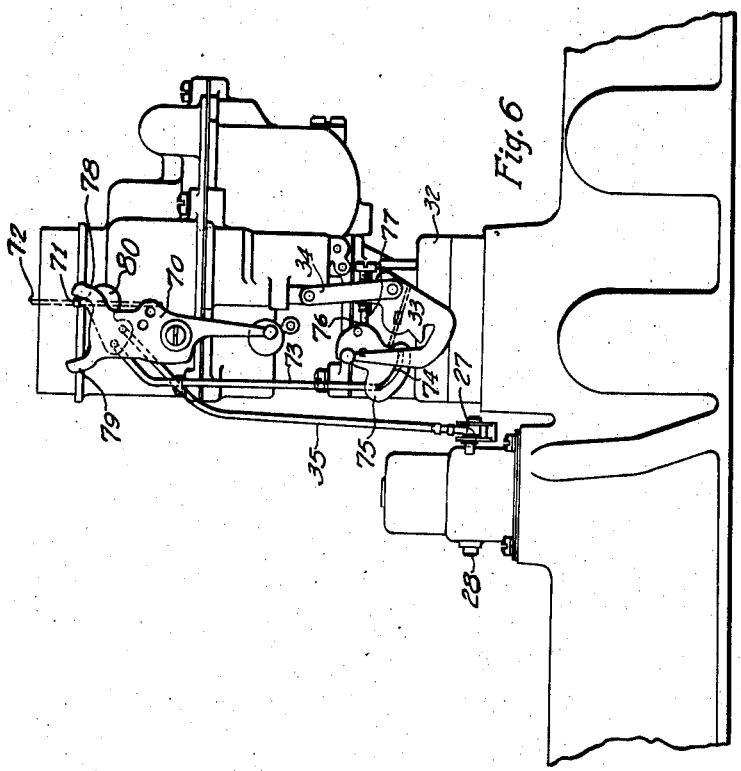
Elmer Olson
INVENTOR.
BY
ATTORNEY Patented July 20, 1943

2,324,592

UNITED STATES PATENT OFFICE 2,324,592

HEAT CONTROL

Elmer Olson, Detroit, Mich., assignor to George M. Holley and Earl Holley

Application October 23, 1941, Serial No. 416,207

7 Claims. (Cl. 123—122)

The object of this invention is to delay the response of an automatic choke thermostat as used on an automobile engine with reference to the increase and decrease of the temperature of the exhaust which controls the action of the thermostat.

In automatic chokes in general use, a thermostat is arranged to be heated by the engine exhaust gases and to open the throttle and to close the choke valve when cold. It is usual to increase the idling speed as shown in Church Patent 1,583,959 whenever the choke valve is closed. If the thermostat responds immediately and directly to the exhaust temperature, the engine is apt to run too slowly and to stall because the engine as a whole heats up slowly and lags behind the exhaust temperature, and the thermostat closes or permits the throttle to close too soon so that the engine stalls.

It is the object of this invention to arrange so that the rate of heating up and cooling down of the thermostat controlling the automatic choke takes place at exactly the right rate, so that this stalling does not take place. I have discovered that a time lag should be introduced into the response of the thermostat to the temperature of the exhaust gases, so that the thermostat responds more nearly to the fluctuations in the temperature of the piston head, for example, than to the exhaust which heats up far too quickly to be a criterion of engine temperature.

At the same time, on all automobiles having automatic chokes an automatic valve controlled by a thermostat controls the total amount of heat diverted to the heating of the inlet manifold. It is my discovery that this flow of exhaust gases can best be divided into two streams, one whose sole function is to heat the mixture, the other to heat the thermostat and also to heat the mixture. By this means I can regulate the rate at which the thermostat heats up without interfering with the rate at which the mixture is heated.

The application of an automatic choke to a V-8 or V-12 engine presented the specific problem, the solution of which resulted in this invention.

In the drawings:

Fig. 1 shows a cross sectional elevation of the device taken on plane 1—1 of Figure 2.

Fig. 2 is a cross-sectional elevation taken on plane 2—2 of Fig. 1 and on plane 2—2 of Fig. 3.

Fig. 3 is a plan view taken on plane 3—3 of Fig. 1.

Fig. 4 shows the general arrangement of the device on a V-engine for which this invention is specifically adapted.

Fig. 5 shows a cross sectional elevation on plane 5—5 of Fig. 4.

Fig. 6 shows in elevation the complete installation of a carburetor on the manifold.

Fig. 7 shows an enlargement of the heat control valve shown in Fig. 4.

In Fig. 4, 10 is the exhaust valve of one of a bank of cylinders located on the right hand side of the V-engine. The exhaust flows through the passage 11 past the exhaust heat control valve 12 to the exhaust pipe 13 which unites with an exhaust outlet 14, which receives its exhaust from one of the cylinders in the other bank through the exhaust valve 15. This valve 12 is controlled by a thermostat 52, as shown in the Litle Patent 1,940,628. This thermostat 52 is shown enlarged in Fig. 7.

The heating of the thermostat 20 (see Figs. 1 and 2) is accomplished by means of the exhaust by-pass 16, 17. The exhaust enters the passage 16 through the restriction 38, the size of which determines the amount of exhaust gases flowing through 16 and 17 and also the amount of exhaust gases flowing through the passage 39, 40 (Fig. 3). The relative size of the two streams of exhaust gases is determined by the restriction 36, Fig. 3. If the restriction 36 is small relative to the restriction 38, then most of the exhaust entering at 38 flows around through the passage 16, 17.

The exhaust flowing through 16 and 17 washes over the cup 18. Inside this cup is a second cup 19, separated from the cup 18 by a dead air space, the dimensions of which serve to regulate the rate of heating up of the thermostat 20. The thermostat 20 is mounted on a pin 21 and engages with a roller 22 which is mounted on an arm connected to the shaft 28, which shaft carries the lever 27, which controls the choke valve through the link 35 in the manner shown in Fig. 6, which will be described later.

The link 23 is mounted loosely on the support 24 and rests on the roller 22, and is loosely connected by a link 25 to the thermostat 20. The link 23 is made of iron so that it is attracted by the solenoid 26 when it is energized by an electric current during the starting operation as described in the Sisson Patents 1,544,350, 1,577,765, and 1,577,766. These patents show a starting motor circuit similar to the circuit shown in Fig. 1, in which the solenoid 26 is energized by means of a battery 58, starting switch 55, which starting switch, when closed, also energizes the engine starting motor 59. The upward movement of the link 23 causes the link 25 to pull on the thermostat 20 and thereby rotate the shaft 28 and through the shaft 28 the lever 27 counter-clockwise by means of the roller 22 which is connected rigidly to the shaft 28. The moment the engine fires and the starting switch 55 is opened, the solenoid 26 becomes ineffective and the lever 27 is rotated clockwise by gravity assisted by a spring, and the position it ultimately assumes is determined by the roller 22 which engages with the upper leg of the thermostat 20.

Obviously, if the thermostat is hot, the lever 27 can rotate further in a clockwise direction before the roller 22 engages with the upper arm of the thermostat 20, in which case the rod 35 will not move very far and hence the choke valve (Fig. 6) connected to the rod 35 is not moved very much. For the same reason, in cold weather the lever 27 rotates a smaller distance than it does in hot weather in a clockwise direction before the roller 22 engages the thermostat 20, in which case the rod 35 moves further than it did before and hence the choke valve is moved a considerable distance, and hence the engine is given a richer mixture for starting.

The rate of heating up of the thermostat 20 is controlled by the dead air space between the pans 18 and 19, and determines the position of the lever 27 which in its turn determines the position of the choke valve (see Fig. 6), and hence the degree of richness of the mixture, during the starting operation and the idling speed.

The lower half of the carburetor is shown in Fig. 1 and is numbered 32. A throttle arm is shown at 33 together with the accelerating pump connection 34 (see Fig. 6).

In Fig. 2 the mixture inlet passages 30 and 31 are shown in cross section and in Fig. 3 the mixture outlets 46 and 47 and also 29 and 37 are shown which convey the mixture to the inlet passage of the engine. The relative heating effect of the exhaust gas on the carburetor and on the thermostat is regulated by the restriction 36 (Fig. 3). Some of the exhaust gases flowing through 38 pass through the passage 16 to the outlet 17, but some of the exhaust gases take a longer route, namely, they travel along the passage 39 to the heating chamber 40, which forms a heating jacket for the mixture outlets from the carburetor located in the inlet manifold (see Fig. 5).

The opening 38 controls the available amount of exhaust heat both for heating the thermostat and for the heating chamber 40. The smaller 36 is, the less exhaust flows to the mixture heating chamber 40 and the more is available for the thermostat.

On the forward end of the manifold an unrestricted opening 43 furnishes exhaust gases to the passage 45 which discharges through the unrestricted opening 44. The reason for this is that the cooling effect of the air from the engine fan tends to cool the mixture in the passages 46, 47, 48 and 50 more than in the passages 29, 37, 49 and 51.

The carburetor has two outlets, one communicating with the passage 41 which leads to the passage 30 which, in its turn, discharges mixture through the ports 37, 47, 48 and 49. The other carburetor outlet 42 communicates with the other horizontal passage 31 which discharges through ports 29, 46, 50 and 51.

In Fig. 6, the shaft 28 operates the lever 27 to which is connected the lever 35 which is connected to the element 80 which is mounted on the shaft carrying the choke valve 72. A projection 71 extends from the element 80 and is located between the jaws 79 and 78 of the lever 70. The lever 70 is manually controlled and in the position shown, the choke valve 72 is automatically controlled; or the lever 70 can be moved counter-clockwise, in which case the choke valve 72 is held closed positively; or the lever 70 can rotate clockwise and the lip 79 engages with the projection 71, and holds the choke valve 72 open positively. The choke valve 72 is eccentrically mounted so that the air flow into the choke valve tends to open the choke valve 72. The link 73 connects the element 80 with the slot 74 of the element 75.

The element 75 has a fast idle cam surface 76 which engages with the idle stop pin 77. The idle stop pin 77 is carried integral with the lever 33 which carries the throttle valve so that the fast idle is determined by the position of the cam surface 76 of the element 75. The pressure of the pin 77 against the cam surface 76 of the element 75 holds this element in place. The result is that in order that the thermostat can be free to move when the throttle is closed and the engine is standing still, the slot 74 permits the element 73 to descend as the choke valve closes and the engine gets colder. The pressure of the pin 77 against the cam surface 46 holds this element in place. The result is that the pin 73 slides in the slot 74. The moment the throttle is opened, then the pressure of the pin 77 against the cam surface 76 is removed and the weight of the element 75 is such as to cause the element 75 to rotate to the position determined by the position of the rod 73, which is determined by the thermostat 20 and which determines the fast idle position for that particular temperature. The cam surface 76 is such that in cold weather the throttle is more open than it is in hot weather, which is a fundamental requirement in all automatic choke mechanisms. The invention, however, is not directed to the fast idle and the thermostatic control therefor, but is directed to the delay in the operation of the thermostat 20, which is controlled by the dead air space between the pans 18 and 19.

This arrangement I find applies just the right amount of heat to the thermostat, so that the choke valve is permitted to open at the right rate. If the opening 36 is made smaller, more heat flows over the bottom of the shallow pan 18 and the thermostat is heated up faster. If the opening 38 is made larger, more heat flows to the passages 38, 17 and 16, and more heat is applied to the mixture outlet 37. As the car moves to the left, air flows to the right; hence the outlets 46 and 47 require more heat. The additional mixture outlets 48, 49, 50 and 51 are heated by the walls of the inlet passages which conduct heat from the exhaust passages to the walls of the inlet.

Operation

When the engine is first started, the engine is usually cold. The moment it fires, the exhaust quickly heats up because of the velocity with which the exhaust gases flow through the cold passages. The outer cup 18 heats up quickly and the inner cup 19 follows the temperature of the cup 18 after a period of time determined by the distance between the two cups 18 and 19, or the thickness of the cushion of air between the two cups 18 and 19. The evaporation of the liquid portion of the fuel in the mixture is largely determined by the combustion chamber generally, the temperature of the middle of the piston specifically. When this is hot a relatively lean mixture can be exploded. Hence the thermostat 20 should respond to the temperature in the middle of the piston in the engine.

Until the pistons reach their normal temperature, it is necessary to provide a relatively rich mixture. These pistons will not heat up as fast as will the exhaust gases flowing through the passes 16 and 17. This is especially true where a thermostat 52 (Fig. 4) is used because then the gases are driven through the by-passes 16 and 17 at a great rate when the engine starts and until such time as the thermostatic control valve 12 is opened by the thermostat 52, which is under the influence of the air blown over the engine by the cooling fan. Hence the manifold heats up very rapidly, which is the purpose of the thermostat 52.

When the engine has been running for some time and is stopped, the exhaust gases immediately lose their heat because there are no longer any gases flowing through the passages 16 and 17, and of course, the temperature of the exhaust gases is very much higher than that of the walls of the inlet manifold through which the exhaust gases flow. The thermostat 20, however, does not cool as fast as the passages 16 and 17, because the air between the two cups 18 and 19 acts as an insulator and retains its heat for an appreciable period of time. The result is the thermostat 20 cools down no faster than the piston, the temperature of which is the chief factor in determining the necessary mixture ratio to form an explosive mixture.

There is a third condition in which it is desirable to have a lag in the response of the thermostat to atmospheric conditions, and that is when leaving a warm garage and driving into a head wind at zero temperature. The inlet manifold is immediately subjected to a blast of zero air and the gases flowing through the by-passes 16 and 17 drop in temperature almost instantaneously, but the piston does not cool down as rapidly as does the temperature of the gases flowing through the by-passes 16 and 17, and again the presence of an air cushion between the two cups 18 and 19 introduces the necessary time lag between the response of the thermostat 20 and the drop of atmospheric temperature.

As taught in the Church Patent 1,583,959, the idling speed is determined by the degree to which the choke valve is closed. Hence the tendency of the engine to stall is determined by the position of the choke which not only increases the richness of the running mixture, but also increases the idling speed of the engine.

Not only is this construction, therefore, one which gives a desirable lag in time between the changes of temperature which affect the thermostat and the movement of the thermostat, but the construction is such that by varying the distance between the two cups, or by varying the thickness of the metal walls of the cups, or both, it is a very simple matter to select the ideal thickness of the cups and the ideal distance between the cups to prevent the engine stalling during the warm-up period.

In addition, the relative and absolute size of the two orifices 36 and 38 can be changed to ensure that the temperatures of the inlet mixture in the ports 48, 47, 37, 49, 51, 29, 46 and 50 increase at an equal rate and the thermostat 20 permits the choke valve 12 to open and the throttle stop 77 to permit the throttle to close during the warm-up period to avoid stalling and to ensure that all the cylinders fire at all times during the warm-up period.

What I claim is:

1. A heating device for a thermostat adapted to control the mixture ratio and the idling speed of an automobile engine during the warm-up period, comprising an exhaust passage, a heating cup adapted to be directly heated by said exhaust, a second heating cup arranged inside of said first heating cup and separated therefrom by an air jacket, the second heating cup being adapted to enclose and support the said thermostat.

2. In a multi-cylinder internal combustion engine of the V-type having an exhaust manifold, a carburetor, a thermostat adapted to control the position of the choke valve and the idling speed of said carburetor, an exhaust outlet from one bank of cylinders, a similar exhaust outlet from the other bank of cylinders, a common outlet pipe leading to the atmosphere, an exhaust control valve in the first mentioned outlet, and two exhaust by-passes arranged in parallel communicating with both exhaust outlets, said by-passes having a common entrance, one of the by-passes being adapted to heat said inlet manifold, a double wall incorporating a dead air space forming a wall of the other exhaust passage, said thermostat being mounted on the outside of said double wall, so as to be indirectly heated by the exhaust gases.

3. In a device as set forth in claim 2, a restriction in the common entrance to the two by-passes, and a second restriction in one of the by-passes whereby the first restriction determines the total volume of exhaust gases diverted for heating and the second restriction determines the distribution of this volume between the two by-passes.

4. In a device as set forth in claim 2 in which there is a second thermostat connected to said exhaust control valve and responsive to the circumambient atmosphere adjacent to the first mentioned exhaust outlet for controlling the amount of exhaust gases flowing through said exhaust by-passes.

5. A heating device for a thermostat adapted to control the mixture ratio and idling speed of an automobile engine, comprising a chamber adapted to enclose said thermostat and having a wall in thermal contact with said thermostat and adapted to be heated by the exhaust gases from said engine, and heat insulating means on said wall adapted to delay the transfer of heat from said exhaust gases to said thermostat.

6. A heating device for a thermostat adapted to control the mixture ratio and idling speed of an automobile engine comprising an exhaust passage, a chamber adapted to enclose said thermostat, one of the walls of said chamber being hollow, said thermostat being in contact with said hollow wall of said chamber, said wall being adapted to be heated by the exhaust from said engine, the hollow space in said wall being adapted to delay the transfer of heat through said wall to said thermostat.

7. A heating device for a thermostat adapted to control the mixture ratio and idling speed of an automobile engine, comprising an exhaust passage, a second thermostat adapted to control the flow of exhaust gases through said passage, a chamber having a wall adapted to be heated by said exhaust passage, the first mentioned thermostat being located within said chamber in contact with the heated wall thereof, and heat insulating means on said wall adapted to delay the transfer of heat from the exhaust gases through said wall to said thermostat for the purpose described.

ELMER OLSON.